R. SIEGFRIED.
ROLLER BEARING FOR ROCKER RINGS.
APPLICATION FILED MAY 1, 1905.

910,964.

Patented Jan. 26, 1909.
2 SHEETS—SHEET 1.

WITNESSES:
Fred H. Miller
R. J. Dearborn

INVENTOR
Robert Siegfried
BY
Wesley L. Carr
ATTORNEY

R. SIEGFRIED.
ROLLER BEARING FOR ROCKER RINGS.
APPLICATION FILED MAY 1, 1905.

910,964.

Patented Jan. 26, 1909.
2 SHEETS—SHEET 2.

WITNESSES:
Fred H. Miller
R. P. Dearborn

INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

ROLLER-BEARING FOR ROCKER-RINGS.

No. 910,964.  Specification of Letters Patent.  Patented Jan. 26, 1909.

Application filed May 1, 1905. Serial No. 258,396.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Roller-Bearings for Rocker-Rings, of which the following is a specification.

My invention relates to means for mounting infrequently moved or rotated parts and particularly to means for mounting the rocker-rings that support the commutator brushes of dynamo electric machines.

My invention has for its object to provide mountings and bearings for machine members of large dimensions and great weight which shall be of such character that the members may be easily moved.

In the larger sizes of direct current dynamo electric machines, the rocker-rings that carry the commutator brushes are of such large dimensions and great weight that great difficulty has been experienced in effecting adjustment of the commutator brushes, or else elaborate and expensive means have been employed for the purpose.

It is the usual practice to provide the rocker-rings of dynamo electric machines with cylindrical or annular faces that correspond to similar faces on the field magnet frame with which they are adapted to engage, and according to my invention, friction between the engaging faces is reduced by means of roller bearings, the novel features of which will be now described with reference to the accompanying drawings, in which—

Figure 1:
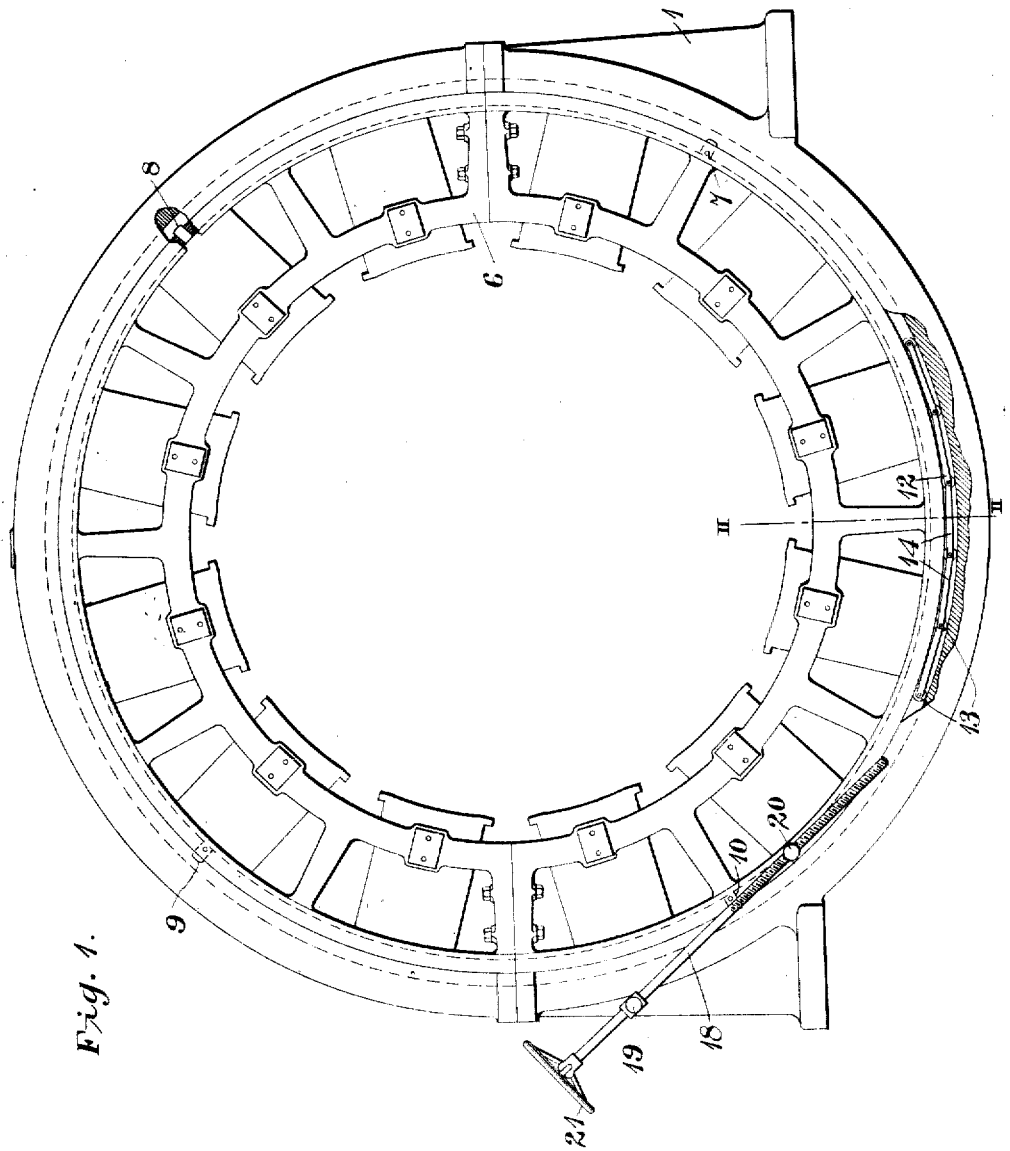
Figure 2:
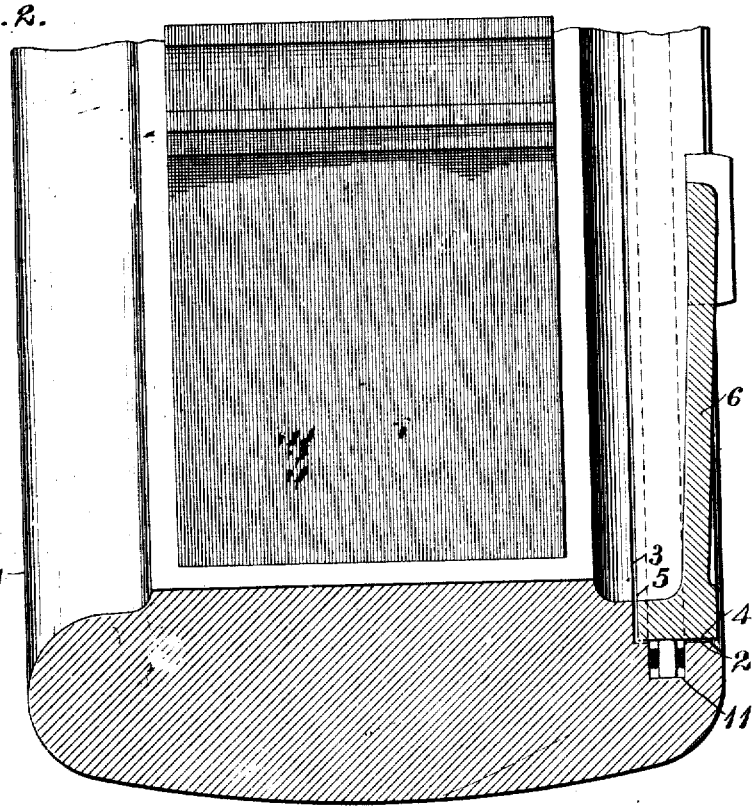
Figure 3:
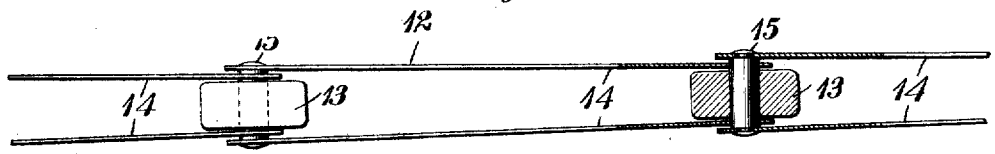

Figure 1 is a view in side elevation of a dynamo-electric machine embodying my invention. Fig. 2 is a cross-sectional view of the machine shown in Fig. 1, in a plane indicated by the lines II—II, and Fig. 3 is a view of a chain which constitutes one of the elements of my invention.

Referring to the drawings, one end of a field magnet frame 1 is provided with an annular recess to receive the rocker-ring 6, the surfaces 4 and 5 of which are in engagement with or in close proximity to the corresponding surfaces 2 and 3 of the recess. The rocker-ring is held in position by a series of pins 7, 8, 9 and 10, which project into a circumferential groove or channel 11 and are spaced substantially at equal intervals around the circumference of the ring 6.

A roller chain 12 which is located at the bottom of the field magnet frame 1 in the groove 11, comprises a plurality of rollers 13 and connecting links 14, both of which are mounted on a series of pivot pins 15, the chain being so constructed with respect to the groove 11 that it is free to move therein. The diameter of the rollers 13 is slightly greater than the depth of the groove 11 so that the rocker-ring 6 rests upon the rollers and may readily be rotated, by any convenient means, through a sufficient angle for adjustment of the brushes which may be supported upon the rocker-ring 6, in the usual manner.

A suitable means for rotating the rocker-ring 6 comprises a screw-threaded shaft 18 which is mounted on the frame 1 in a bearing 19 and engages a swivel nut 20 on the rocker-ring 6, the shaft 18 being actuated by a hand-wheel 21.

Although I have, for convenience, shown and described a specific arrangement of devices and a single application to a dynamo-electric machine, I desire it to be understood that all variations in size, form or arrangement of parts which do not materially affect the results obtained are within the scope of my invention and that its application is in no way limited to any specific form or class of machine.

I claim as my invention:

1. In a dynamo-electric machine, the combination with a stationary frame having an annular end recess and a circumferential groove or channel, of a movable rocker-ring located in said recess, a roller chain located in the said groove or channel at the bottom of the machine, and guide pins projecting from the rocker ring into the groove or channel.

2. In a dynamo-electric machine, the combination with a stationary frame having an annular end recess and a circumferential channel, of a movable rocker-ring located in said annular recess, a chain located in the said channel at the bottom of the machine to support the weight of the movable ring, and comprising a plurality of rollers, pivots and connecting links, and uniformly spaced guide pins projecting from the rocker ring into the channel.

3. In a dynamo-electric machine, the combination with a stationary frame having an annular end recess and a circumferential channel, of a movable rocker-ring located in said recess, a roller chain located in the said channel at the bottom of the machine and consisting of a plurality of rollers rotatably mounted on pins and connected by a series of links, and guide projections on the rocker-ring that engage the channel without interfering with the movement of the roller chain.

4. In a dynamo-electric machine, the combination with a stationary field magnet frame having an annular end recess and a circumferential channel, of a relatively movable rocker-ring seated in said recess, a roller chain located in the said channel at the bottom of the machine to support the rocker-ring and comprising a plurality of rollers rotatably mounted on pins and connected by a series of spacing links, and guide pins uniformly disposed about the rocker-ring to engage the channel without interfering with the movement of the roller chain or the rocker-ring.

In testimony whereof, I have hereunto subscribed my name this 28th day of April, 1905.

ROBERT SIEGFRIED.

Witnesses:
EDWIN TIDLUND,
BIRNEY HINES.